(12) United States Patent
Evans et al.

(10) Patent No.: US 7,953,083 B1
(45) Date of Patent: May 31, 2011

(54) MULTICAST QUERY PROPAGATION SCHEME FOR A PEER-TO-PEER (P2P) NETWORK

(75) Inventors: James Evans, Apex, NC (US); Richard J. Walsh, Raleigh, NC (US); Kunal Kandekar, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 657 days.

(21) Appl. No.: 11/609,514

(22) Filed: Dec. 12, 2006

(51) Int. Cl.
*H04L 12/56* (2006.01)

(52) U.S. Cl. ......... 370/390; 370/432; 709/226; 709/224

(58) Field of Classification Search .................. None
See application file for complete search history.

(56) References Cited

U.S. PATENT DOCUMENTS

| | | | |
|---|---|---|---|
| 5,694,591 A | 12/1997 | Du et al. | |
| 5,940,504 A | 8/1999 | Griswold | |
| 5,956,038 A | 9/1999 | Rekimoto | |
| 6,285,380 B1 | 9/2001 | Perlin et al. | |
| 6,499,035 B1 | 12/2002 | Sobeski | |
| 6,577,328 B2 | 6/2003 | Matsuda et al. | |
| 6,795,817 B2 | 9/2004 | Agarwal et al. | |
| 6,804,662 B1 | 10/2004 | Annau et al. | |
| 6,912,565 B1 | 6/2005 | Powers et al. | |
| 6,993,587 B1* | 1/2006 | Basani et al. | 709/229 |
| 7,039,634 B2 | 5/2006 | Xu et al. | |
| 7,089,301 B1 | 8/2006 | Labio et al. | |
| 7,451,131 B2 | 11/2008 | Curtis et al. | |
| 2002/0073075 A1 | 6/2002 | Dutta et al. | |
| 2002/0147771 A1 | 10/2002 | Traversal et al. | |
| 2003/0014423 A1 | 1/2003 | Chuah et al. | |
| 2003/0088544 A1 | 5/2003 | Kan et al. | |
| 2003/0115132 A1 | 6/2003 | Iggland | |
| 2003/0126245 A1 | 7/2003 | Feltin et al. | |

(Continued)

FOREIGN PATENT DOCUMENTS

EP 1 176 828 A2 1/2002
(Continued)

OTHER PUBLICATIONS

B. Haberman, "Allocation Guidelines for IPv6 Multicast Addresses," (article), Aug. 2002, 8 pages, The Internet Society, http://tools.ietf.org/html/rfc3307.

(Continued)

*Primary Examiner* — Chirag G Shah
*Assistant Examiner* — Steve Young
(74) *Attorney, Agent, or Firm* — Withrow & Terranova, PLLC

(57) ABSTRACT

A multicast query propagation scheme for a Peer-to-Peer (P2P) network is provided. A number of first level (L1) peer nodes are associated with a second level (L2) peer node to form an L1 peer group. The L2 peer node operates as a super peer node for the L1 peer group and allocates two Source-Specific Multicast (SSM) channels operating as a control and query channel for the L1 peer group. Similarly, a number of other L1 peer groups are formed. An L2 peer group is formed by a third level (L3) peer node and the L2 peer nodes. The L3 peer node operates as a super peer node for the L3 peer group and allocates two SSM channels operating as a control and query channel for the L2 peer group. Using the control and query channels of the L1 and L2 peer groups, queries are propagated throughout the P2P network.

22 Claims, 6 Drawing Sheets

U.S. PATENT DOCUMENTS

| | | | |
|---|---|---|---|
| 2003/0131006 | A1 | 7/2003 | Monahan et al. |
| 2003/0158839 | A1 | 8/2003 | Faybishenko et al. |
| 2003/0177187 | A1 | 9/2003 | Levine et al. |
| 2004/0019657 | A1 | 1/2004 | Akiyama |
| 2004/0260701 | A1 | 12/2004 | Lahikoinen et al. |
| 2005/0021394 | A1 | 1/2005 | Miedema et al. |
| 2005/0021758 | A1* | 1/2005 | White ............... 709/226 |
| 2005/0076207 | A1 | 4/2005 | Park et al. |
| 2005/0185663 | A1* | 8/2005 | Lehtonen ............ 370/432 |
| 2005/0203890 | A1 | 9/2005 | Chen et al. |
| 2005/0207354 | A1 | 9/2005 | Nekovee et al. |
| 2006/0085385 | A1 | 4/2006 | Foster et al. |
| 2006/0095763 | A1 | 5/2006 | Iyengar et al. |
| 2006/0190427 | A1 | 8/2006 | Peters et al. |
| 2006/0218274 | A1 | 9/2006 | Labio et al. |
| 2007/0050761 | A1 | 3/2007 | Hester et al. |
| 2007/0058627 | A1* | 3/2007 | Smith et al. ......... 370/390 |
| 2007/0087819 | A1 | 4/2007 | Van Luchene et al. |
| 2008/0027923 | A1 | 1/2008 | George et al. |
| 2008/0126308 | A1 | 5/2008 | Wooldridge et al. |

FOREIGN PATENT DOCUMENTS

| | | | |
|---|---|---|---|
| EP | 1 443 704 | A1 | 8/2004 |
| EP | 1 494 432 | A2 | 1/2005 |
| KR | 1020030036290 | | 5/2003 |
| WO | WO 98/47091 | A1 | 10/1998 |
| WO | WO 00/42555 | A1 | 7/2000 |
| WO | WO 02/15035 | A2 | 2/2002 |
| WO | WO 03/081447 | A1 | 10/2003 |
| WO | WO 2004/002048 | A1 | 12/2003 |
| WO | WO 2007/011752 | A2 | 1/2007 |
| WO | WO 2007/027361 | A2 | 3/2007 |

OTHER PUBLICATIONS

Beverly Yang et al., "Designing a Super-Peer Network," (article), 2003, 15 pages, ICDE, 19th International Conference on Data Engineering (ICDE'03).

Bjorn Knutsson et al., "Peer-to-Peer Support for Massively Multiplayer Games," (article), Mar. 2004, 12 pages, in the 23rd Conference of the IEEE Communications Society (INFOCOM '04), Hong Kong, China.

No Author, Dive Tutorial, (website), obtained Mar. 19, 2007, 8 pages, http://www.sics.se/dive/manual/tutorial/.

Xinwen Zhang, "P2P and Content Distribution," (PowerPoint Presentation), Oct. 25, 2005, 20 pages, http://www.list.gmu.edu/zhang/isa767/p2p-6.pdf.

Evangelos P. Markatos, "Tracing a Large-Scale Peer to Peer System: An Hour in the Life of Gnutella," (article), 2002, 11 pages, Proc. Second IEEE/ACM Int'l Symp, Cluster Computing and the Grid.

Jouni Smed et al., "A Review on Networking and Multiplayer Computer Games," (article), Apr. 2002, pp. 30, Technical Report No. 454, Turku Centre for Computer Science.

Juan Li, "ECSP: An Efficient Clustered Super-Peer Architecture for P2P Networks," (article), Aug. 2003, 82 pages, The University of British Columbia.

Kunwadee Sripanidkulchai, "The Popularity of Gnutella Queries and Its Implications on Scalability," (article), Feb. 2001, 7 pages, http://www.cs.cmu.edu/~kunwadee/research/p2p/gnutella.html.

No Author, Main Page—Solipsis, (website), obtained Feb. 6, 2007, 2 pages, http://solipsis.netofpeers.net/wiki2/index.php/Main_Page.

Mayank Mishra et al., "Performance enhancement with passive caching in Peer-to-peer systems," (article), date unknown, 10 pages.

No Author, Microsoft masthead frame with global toolbar, (website), obtained Oct. 10, 2007, 3 pages, http://www.microsoft.com/resources/documentation/windows/xp/all/proddocs/en-us/sag_liceconcepts_401.mspx?mfr=true.

No Author, "Multiverse Technology: An Overview," (article), 2005, 12 pages, http://www.multiverse.net/platform/whitepapers/mv_overview.pdf.

Wolfgang Nejdl et al., "Super-Peer-Based Routing Strategies for RDF-Based Peer-to-Peer Networks," (article), 2004, pp. 177-186, vol. 1, No. 2, Journal Web Semantic.

No Author, Public-key cryptography— Wikipedia, (website), obtained Mar. 19, 2007, 12 pages, http://en.wikipedia.org/wiki/Public-key_cryptography.

S. Bhattacharyya, "An Overview of Source-Specific Multicast (SSM)," (article), Jul. 2003, 13 pages, The Internet Society, http://tools.ietf.org/html/rfc3569.

Sally Floyd et al., "A Reliable Multicast Framework for Light-weight Sessions and Application Level Framing," (article), Dec. 1997, pp. 784-803, vol. 5, No. 6, IEEE/ACM Transactions on Networking.

Sally Floyd et al., "A Reliable Multicast Framework for Light-weight Sessions and Application Level Framing," (article), Nov. 1996, 23 pages, IEEE/ACM Transactions on Networking.

Shun-Yun Hu et al., "Scalable Peer-to-Peer Networked Virtual Environment," (article), Aug. 2004, pp. 129-133, in Proc. 3rd ACM SIGCOMM 2004 workshops on NetGames '04.

No Author, Solipsis—Wikipedia, (website), obtained Mar. 19, 2007, 4 pages, http://en.wikipedia.org/wiki/Solipsis.

Sunil Patro et al., "Transparent Query Caching in Peer-to-Peer Overlay Networks," (article), Apr. 22-26, 2003, 10 pages, In Proceedings of the 17th International Parallel and Distributed Processing Symposium (IPDPS), Nice, France.

Takuji Iimura et al., "Zoned Federation of Game Servers: a Peer-to-peer Approach to Scalable Multi-player Online Games," (article), Aug. 2004, pp. 116-120, in Proc. 3rd ACM SIGCOMM 2004 workshops on NetGames '04.

No Author, "The final Coven multi-user VR platform—D1.4a The Coven Dive platform," (article), Aug. 30, 1998, 49 pages, http://coven.lancs.ac.uk/4/deliverables/del14a.pdf.

No Author, Uni-verse Home, (website), obtained Mar. 19, 2007, 4 pages, http://www.uni-verse.org/Uni-verse-Home.72.0.html.

No Author, Uni-verse On-line Gaming, (website), obtained Mar. 19, 2007, 3 pages, http://www.uni-verse.org/On-line-Gaming.49.0.html.

David Youd, What is a Digital Signature? An introduction to Digital Signatures, (article), obtained Apr. 5, 2007, 4 pages, http://www.youdzone.com/signature.html.

Yingwu Zhu et al., "A Super-Peer Based Lookup in Structured Peer-to-Peer Systems," (article), 2003, 6 pages.

Young-Bae Ko et al., "A Multicast Protocol for Physically Hierarchical Ad Hoc Networks," (article), 2003, 5 pages.

Wolfgang Nejdl et al., "Super-Peer-Based Routing Strategies for RDF-Based Peer-to-Peer Networks," Nov. 18, 2003.

"P2P and Content Distribution," PowerPoint Presentation, http://www.list.gmu.edu/zhang/isa767/p2p-6.pdf, Oct. 25, 2005.

Yingwu Zhu et al., "A Super-Peer Based Lookup in Structured Peer-to-Peer Systems," 2003.

Beverly Yang, Hector Garcia-Molina, "Designing a Super-Peer Network," ICDE, p. 49, 19th International Conference on Data Engineering (ICDE'03), 2003.

Juan Li, ECSP: An Efficient Clustered Super-Peer Architecture for P2P Networks (The University of British Columbia 2003) (Aug. 2003).

Young-Bae Ko et al., "A Multicast Protocol for Physically Hierarchical Ad Hoc Networks," 2003.

Gnutella—Wikipedia, http://en.wikipedia.org/wiki/Gnutella.

Gnutella 2—Wikipedia, http://en.wikipedia.org/wiki/Gnutella2.

* cited by examiner

MULTICAST QUERY PROPAGATION SCHEME FOR A PEER-TO-PEER (P2P) NETWORK

FIELD OF THE INVENTION

The present invention relates to Peer-to-Peer (P2P) networks and more particularly relates to a query propagation scheme for a P2P network.

BACKGROUND OF THE INVENTION

Query propagation, or searching, in the current generation of Peer-to-Peer (P2P) networks is highly inefficient. When a user enters a query at a first peer node, the first peer node sends a query to a number of second peer nodes to which it is connected. Thus, if the first peer node is connected to six other peer nodes, the first peer must send six separate queries. In response, each of the second peer nodes sends the query to third peer nodes to which it is directly connected. This process continues until some threshold is reached that terminates the query or the entire P2P network is searched. This type of query propagation has several issues. First, the query may not reach all peer nodes in the P2P network. Second, each peer node must send the same query multiple times. Lastly, each peer node may receive the query from the same source multiple times along different paths in the network.

In an attempt to address these issues, some P2P networks use a super peer topology. In the super peer topology, a number of super peer nodes are elected and serve as hubs through which associated peer nodes query the P2P network. Each super peer node aggregates metadata from its peer nodes and answers queries from other super peer nodes. Although the super node topology reduces the set of nodes to which a query must be sent in order to search the entire P2P network, it relies heavily on complex technologies such as distributed hash tables to track the content that is hosted by the peer nodes. Further, each super peer node must still send each query multiple times in order to send the query to each super peer node to which it is connected.

Thus, there is a need for an improved query propagation scheme for a P2P network.

SUMMARY OF THE INVENTION

The present invention provides a multicast query propagation scheme for a Peer-to-Peer (P2P) network. In general, the P2P network includes a number of peer nodes, where the peer nodes are grouped to form peer groups. More specifically, a number of first level (L1) peer nodes are associated with a second level (L2) peer node to form an L1 peer group. The L2 peer node operates as a super peer node for the L1 peer group and allocates two Source-Specific Multicast (SSM) channels, where one of the SSM channels operates as a control channel for the L1 peer group and the other SSM channel operates as a query channel for the L1 peer group. In a similar fashion, a number of other L1 peer groups are formed. An L2 peer group is formed by a third level (L3) peer node and the L2 peer nodes. The L3 peer node operates as a super peer node for the L3 peer group and allocates two SSM channels, where one of the SSM channels operates as a control channel for the L2 peer group and the other SSM channel operates as a query channel for the L2 peer group.

When one of the L1 peer nodes desires to query the P2P network, the L1 peer node multicasts a query to the other L1 peer nodes and the L2 peer node in the corresponding L1 peer group via the query channel for the L1 peer group. The L2 peer node then multicasts the query to the other L2 peer nodes via the query channel for the L2 peer group. The other L2 peer nodes then multicasts the query to the L1 peer nodes in the associated L1 peer groups. As a result, the query is propagated throughout the P2P network.

In one embodiment, the query includes an Internet Protocol (IP) address or some other identifier enabling the L1 peer nodes to respond directly to the querying peer node. Upon receiving the query, the L1 peer nodes process the query. If the L1 peer nodes host content satisfying the query, the L1 peer nodes provide responses to the querying peer node. The responses may include information identifying the content satisfying the query as well as information enabling the querying peer node to obtain the content from the associated L1 peer nodes if desired.

In another embodiment, the query includes an IP address or some other identifier of the L2 peer node of the querying peer node. Upon receiving the query, the L1 peer nodes process the query. If the L1 peer nodes host content satisfying the query, the L1 peer nodes provide responses to the L2 peer node of the querying peer node. The L2 peer node then aggregates the responses and provides an aggregate response to the querying peer node. The L2 peer node may, for example, provide the aggregate response to the querying peer node via the query channel of the L1 peer group.

In yet another embodiment, upon receiving the query, the L1 peer nodes process the query. If the L1 peer nodes host content satisfying the query, the L1 peer nodes provide responses to their own L2 peer nodes via, for example, the query channels of the corresponding L1 peer groups. Each L2 peer node then aggregates the responses from the L1 peer nodes in the associated L1 peer group and provides a response to the L2 peer node of the querying peer node via, for example, the query channel of the L2 peer nodes. The L2 peer node of the querying peer node then aggregates the responses from the other L2 peer nodes and provides an aggregate response to the querying peer node via, for example, the query channel of the associated L1 peer group.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
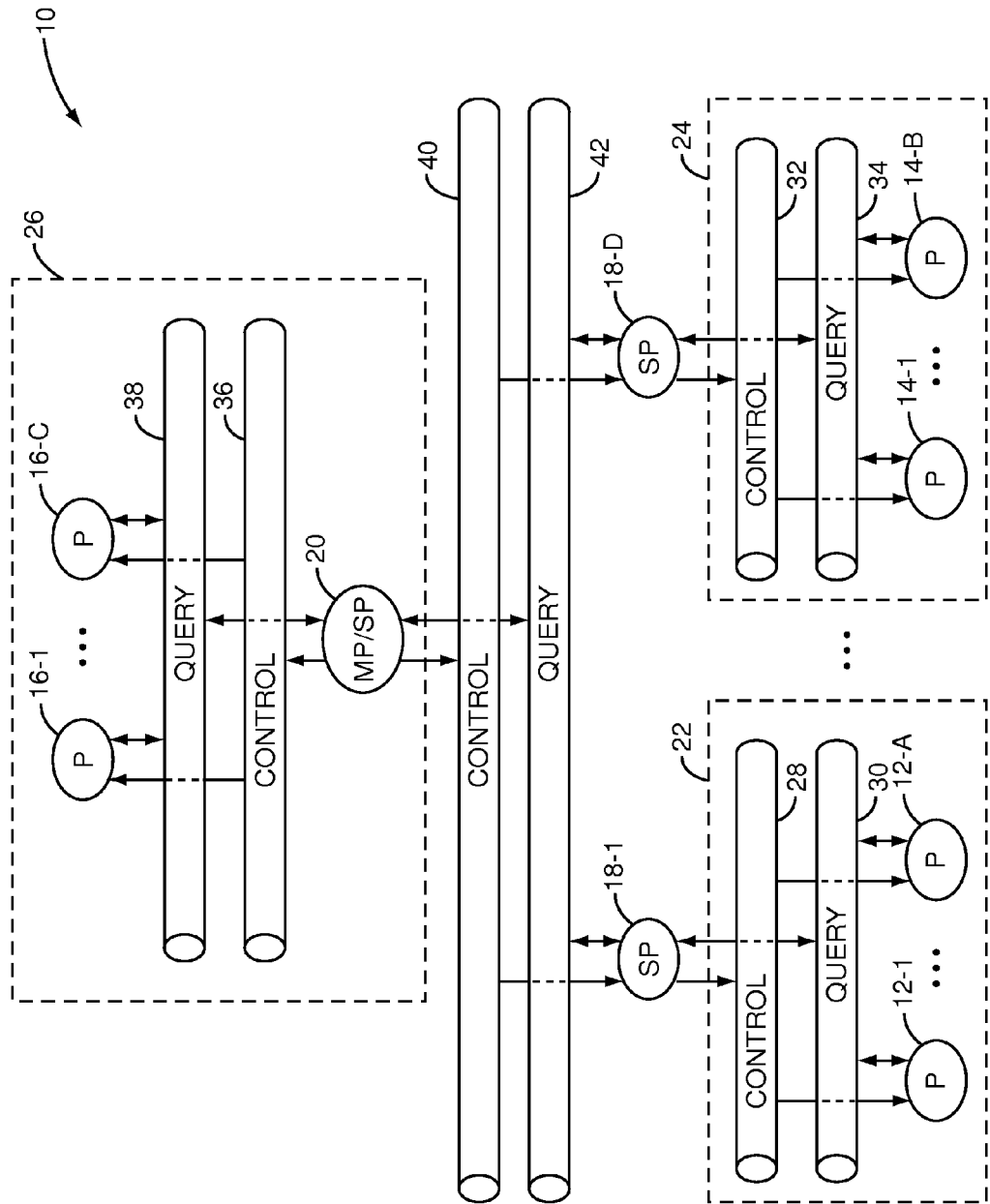
FIG. 1 illustrates a Peer-to-Peer (P2P) network implementing a multicast query propagation scheme according to one embodiment of the present invention.

FIG. 1 illustrates a Peer-to-Peer (P2P) network 10 implementing a multicast query propagation scheme according to one embodiment of the present invention. The P2P network 10 includes first level (L1), or level one, peer nodes 12-1 through 12-A and 14-1 through 14-B; second level (L2), or level two, peer nodes 16-1 through 16-C, where the L2 peer nodes 16-1 through 16-C are select L1 peer nodes from the P2P network; and a third level (L3), or level three, peer node 18, which is a select L2 peer node from the P2P network. The L1 peer nodes 12-1 through 12-A and 14-1 through 14-B; L2 peer nodes 16-1 through 16-C; and L3 peer node 18 may each be a network capable device such as, for example, a personal computer, a mobile device such as a Personal Digital Assistant (PDA) or mobile phone, a set-top box such as a TiVo® set-top box, or the like. As will be apparent to one of ordinary skill in the art, the L2 peer nodes 16-1 through 16-C are L1 peer nodes selected using any type of election process known for selecting super peers in a P2P network. In a similar fashion, the L3 peer node 18 may be a select L2 peer node selected in the same election process or a separate election process.

The L1 peer nodes 12-1 through 12-A and the L2 peer node 16-1 form a L1 peer group 20, where the L2 peer node 16-1 operates as a super peer node for the L1 peer group 20. Likewise, the L1 peer nodes 14-1 through 14-B and the L2 peer node 16-C form a L1 peer group 22, where the L2 peer node 16-C operates as a super peer node for the L1 peer group 22. Note that in an alternative embodiment, the L3 peer node 18 may be associated with a number of L1 peer nodes to form another L1 peer group. Similarly, the L2 peer nodes 16-1 through 16-C and the L3 peer node 18 form a L2 peer group 24, where the L3 peer node 18 operates as a super peer node for the L2 peer group 24. While in this example the L1 peer groups 20 and 22 each include only one L2 peer node, the L1 peer groups 20 and 22 may alternatively include multiple L2 peer nodes operating in a collaborative manner for purposes of redundancy and load balancing.

Regarding the L1 peer group 20, a control multicast channel 26 and a query multicast channel 28 are allocated by the L2 peer node 16-1 for the L1 peer group 20 and used to enable querying of the P2P network 10 as described below. The channels 26 and 28 are hereafter referred to as control channel 26 and query channel 28, respectively. As discussed herein, the channels 26 and 28 are Source-Specific Multicast (SSM) channels provided according to Internet Protocol version 6 (IPv6). However, the present invention may more generally use any type of multicast channel having the ability to limit permissible sources, or "talkers," on the multicast channel. The channels 26 and 28 may be formed over a Wide Area Network (WAN), a Local Area Network (LAN), or the like, and may be formed using wired and/or wireless components. For example, the channels 26 and 28 may be formed over an IP network such as the Internet.

In general, an SSM channel enables multicast packets originating at one or more specific source addresses to be delivered to any device subscribing, or "listening," to the SSM channel. Thus, an SSM channel limits permissible sources, or "talkers," on the SSM channel to devices associated with one or more specific source addresses, which may more specifically be source IP addresses. Only the permissible sources are permitted to multicast messages over the SSM channel. More specifically, while any device may talk or send messages on the SSM channel, the devices listening on the channels may only listen to messages from devices on a list of permissible sources for the SSM channel. The devices listening to the SSM channel ignore or disregard messages from devices that are not on the list of permissible sources for the SSM channel. It should be noted that by implementing the channels 26 and 28 as SSM channels, pollution of the channels 26 and 28 and attacks on the P2P system 10, which would be issues with typical multicast channels, are prevented. For more information regarding SSM channels, the interested reader is directed to RFC 3307 entitled "Allocation Guidelines for IPv6 Multicast Addresses" which can be found at http://tools.ietf.org/html/rfc3569 and RFC 3569 entitled "An Overview of Source-Specific Multicast (SSM)" which can be found at http://tools.ietf.org/html/rfc3307, both of which are hereby incorporated herein by reference in their entireties.

The L2 peer node 16-1 is the only permissible source on the control channel 26. Note that if the L1 peer group 20 includes multiple L2 peer nodes for purposes of load sharing and redundancy, each of the L2 peer nodes may be a permissible source on the control channel 26. The L2 peer node 16-1 uses the control channel 26 to multicast a list of permissible sources for the query channel 28 to the L1 peer nodes 12-1 through 12-A. In one embodiment, the permissible sources for the query channel 28 are the L1 peer nodes 12-1 through 12-A registered with the L2 peer node 16-1. As discussed below, the query channel 28 is used by the L1 peer nodes 12-1 through 12-A and the L2 peer node 16-1 to query the P2P network 10 and optionally to receive responses to their queries from the P2P network 10. Note that the L2 peer node 16-1 may further limit the permissible sources for the query channel 28. For example, if the L2 peer node 16-1 receives an excessive number of queries from the L1 peer node 12-1, the L2 peer node 16-1 may remove the L1 peer node 12-1 from the list of permissible sources for the query channel 28 and issue an updated list of permissible sources for the query channel 28 to the L1 peer nodes 12-1 through 12-A via the control channel 26. A threshold defining what number of queries is excessive may be pre-defined or dynamically controlled by, for example, an administrator of the P2P network 10.

As an aside, rather than removing an L1 peer node from the list of permissible sources for the associated L1 peer group in response to determining that the L1 peer node is the source of an excessive number of queries, the associated L2 peer node may throttle the queries from the L1 peer node. For example, the L2 peer node may filter the queries from the L1 peer node such that only a desired number of queries per second are multicast to the other L2 peer nodes. As another example, the L2 peer node may queue the queries from the L1 peer node and multicast the queries to the other L2 peer nodes at a desired rate, such as a desired or permissible number of queries per second.

Regarding the L1 peer group 22, the functionality of the L1 peer group 22 is the same as that discussed above for the L1 peer group 20. More specifically, a control multicast channel 30 and a query multicast channel 32 are allocated by the L2 peer node 16-C for the L1 peer group 22 and used to enable querying of the P2P network 10 as described below. The channels 30 and 32 are hereafter referred to as control channel 30 and query channel 32, respectively. As discussed herein, the channels 30 and 32 are SSM channels provided according to IPv6. However, the present invention may more generally use any type of multicast channel having the ability to limit permissible sources, or "talkers," on the multicast channel. The channels 30 and 32 may be formed over a WAN, a LAN, or the like. For example, the channels 30 and 32 may be formed over an IP network such as the Internet.

The L2 peer node 16-C is the only permissible source on the control channel 30. The L2 peer node 16-C uses the control channel 30 to multicast a list of permissible sources for the query channel 32 to the L1 peer nodes 14-1 through 14-B. In one embodiment, the permissible sources for the query channel 32 are the L1 peer nodes 14-1 through 14-B registered with the L2 peer node 16-C. As discussed below, the query channel 32 is used by the L1 peer nodes 14-1 through 14-B and the L2 peer node 16-C to query the P2P network 10 and optionally to receive responses to their queries from the P2P network 10. Note that the L2 peer node 16-C may further limit the permissible sources for the query channel 32.

Note that in an alternative embodiment, the L3 peer node 18 may also operate as a L2 peer node and have an associated L1 peer group like those discussed above.

The operation of the L2 peer group 24 is essentially the same as that of the L1 peer groups 20 and 22. More specifically, the L3 peer node 18 operates to allocate a control multicast channel 34 and a query multicast channel 36 to provide query propagation among the L2 peer nodes 16-1 through 16-C and the L3 peer node 18. The channels 34 and 36 are hereafter referred to as control channel 34 and query channel 36, respectively. As discussed herein, the channels 34 and 36 are SSM channels provided according to IPv6. However, the present invention may more generally use any type of multicast channel having the ability to limit permissible sources, or "talkers," on the multicast channel. The channels 34 and 36 may be formed over a WAN, a LAN, or the like. For example, the channels 34 and 36 may be formed over an IP network such as the Internet.

The L3 peer node 18 is the only permissible source on the control channel 34 unless, of course, there are multiple L3 peer nodes in the L2 peer group 24 for purposes of load sharing and redundancy. The L3 peer node 18 uses the control channel 34 to multicast a list of permissible sources for the query channel 36 to the L2 peer nodes 16-1 through 16-C. In one embodiment, the permissible sources for the query channel 36 are the L2 peer nodes 16-1 through 16-C. As discussed below, the query channel 36 is used by the L2 peer nodes 16-1 through 16-C and the L3 peer node 18 to query the P2P network 10 and optionally to receive responses to queries from the P2P network 10. Note that the L3 peer node 18 may further limit the permissible sources for the query channel 36. For example, if the L2 peer node 16-1 is the source of an excessive number of queries, the L3 peer node 18 may remove the L2 peer node 16-1 from the list of permissible sources for the query channel 36 and issue the updated list of permissible sources for the query channel 36 over the control channel 34. A threshold defining what number of queries is excessive may be pre-defined or dynamically controlled by, for example, an administrator of the P2P network 10.

As an aside, rather than removing an L2 peer node from the list of permissible sources for the associated L2 peer group in response to determining that the L2 peer node is the source of an excessive number of queries, the L3 peer node may throttle the queries from the L2 peer node.

Figure 2:
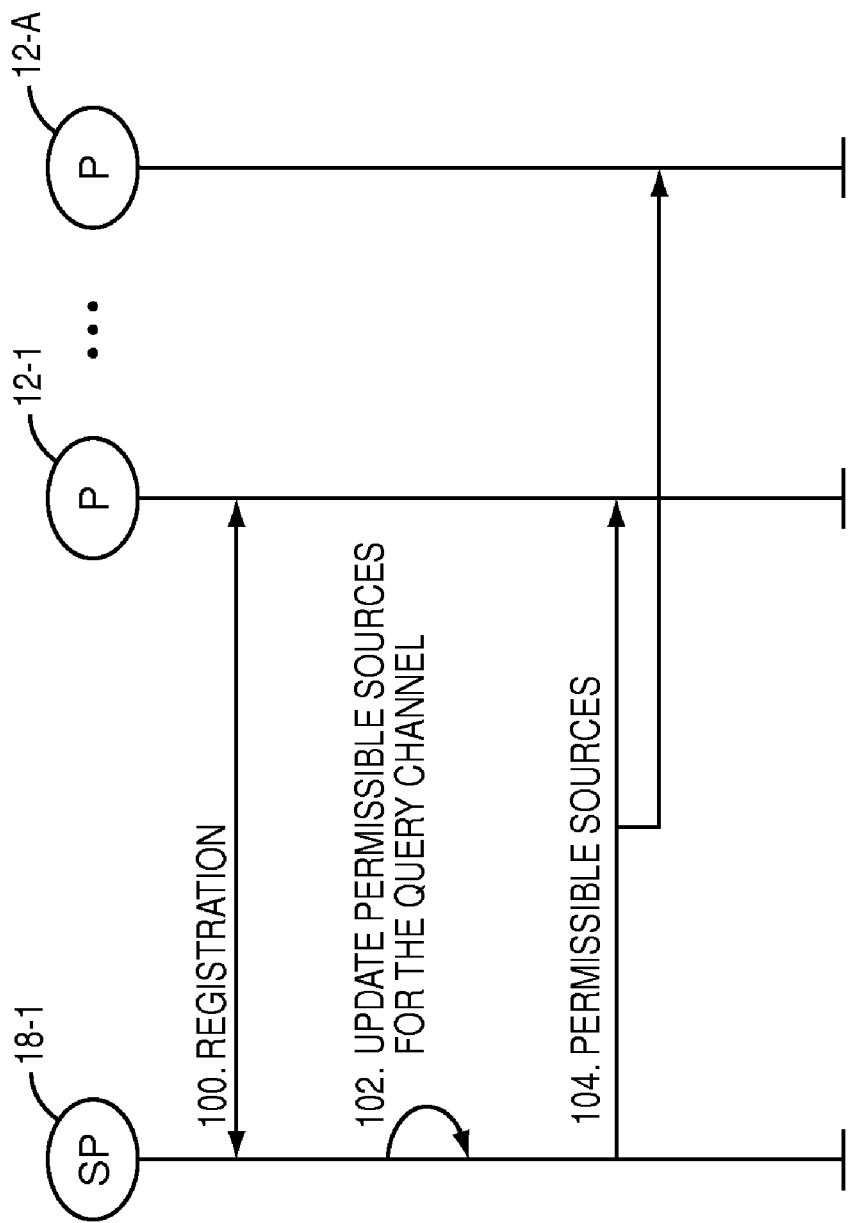
FIG. 2 illustrates the process of registering a peer node with a second level peer node according to one embodiment of the present invention.

FIG. 2 illustrates a registration process for registering an L1 peer node with an L2 peer node according to one embodiment of the present invention. In this example, the L1 peer node 12-1 registers with the L2 peer node 16-1 (step 100). Registration may include authentication and authorization in order to determine whether the L1 peer node 12-1, a user of the L1 peer node 12-1, or both are permitted to join the L1 peer group 20 and/or the P2P network 10. Note that communication over the control and query channels 26 and 28 may be encrypted. If so, the L2 peer node 16-1 may provide the corresponding encryption/decryption key(s) to the L1 peer node 12-1 during registration. After registration, the L2 peer node 16-1 adds the L1 peer node 12-1 to the list of permissible sources for the query channel 28 of the L1 peer group 20 (step 102). The L2 peer node 16-1 then multicasts the updated list of permissible sources for the query channel 28 to the L1 peer nodes 12-1 through 12-A via the control channel 26 (step 104). Note that the updated list may be the complete list of permissible sources or only updates to the previous list of permissible sources. The L1 peer node 12-1 may join, or subscribe to, the control and query channels 26 and 28 during registration, at the conclusion of registration, or alternatively after the updated list of permissible sources has been multicast to the other L1 peer nodes in the L1 peer group 20.

It should be noted that a L1 peer node may optionally be permitted to subscribe to the control and query channels 26 and 28 without first registering with the L2 peer node 16-1. For example, the L1 peer node may subscribe to the control and query channels 26 and 28 in order to monitor queries and/or responses to queries in order to determine whether the L1 peer device desires to join the L1 peer group 20. This may be the case where communication over the channels 26 and 28 is not encrypted. However, the L1 peer node will not be permitted to issue queries on the query channel 28 until the L1 peer node registers with the L2 peer node 16-1 and becomes a permissible source for the query channel 28.

Figure 3:
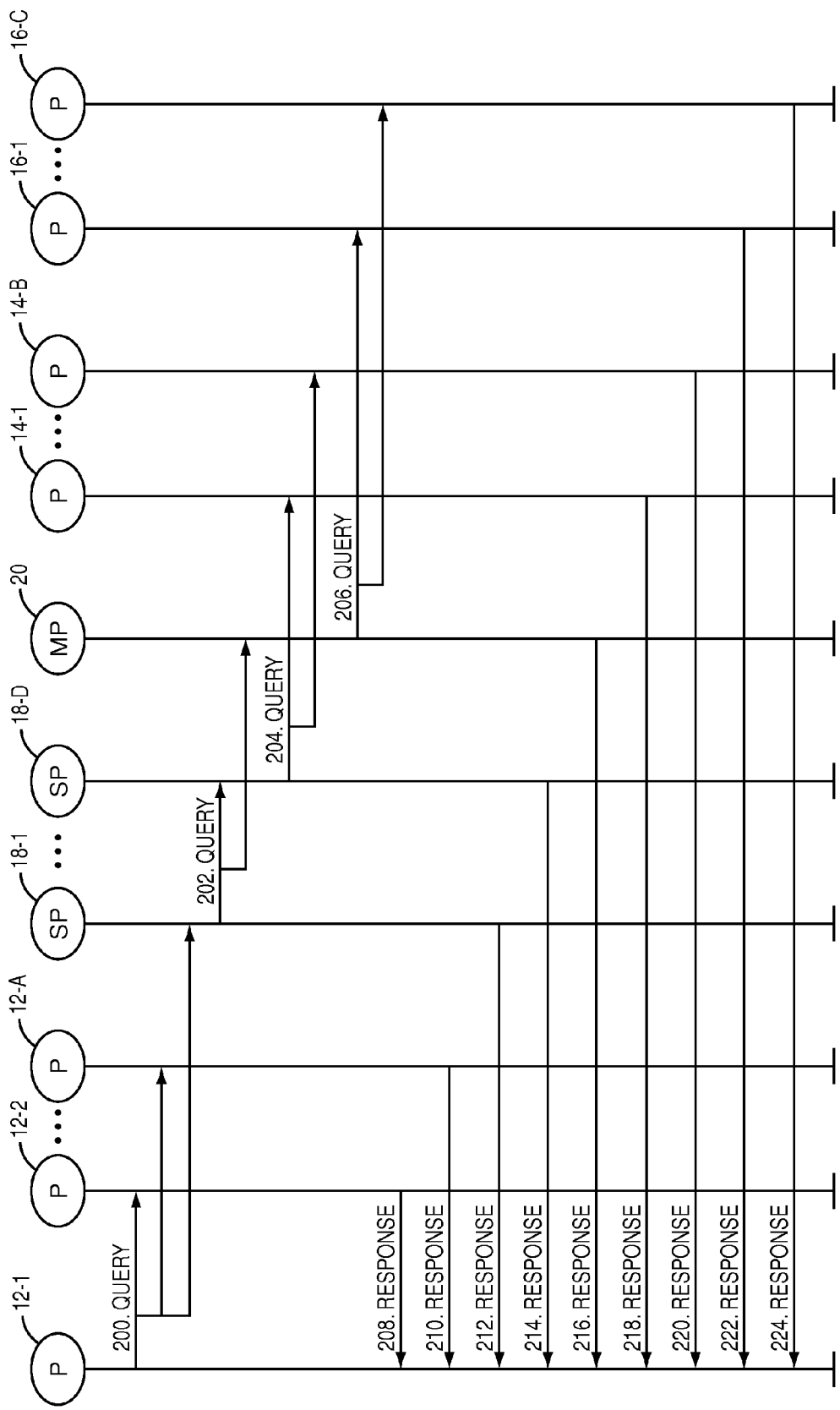
FIG. 3 illustrates the operation of the P2P network of FIG. 1 according to a first embodiment of the present invention.

FIG. 3 illustrates the operation of the P2P network 10 of FIG. 1 according to a first embodiment of the present invention. First, the L1 peer node 12-1 multicasts, or issues, a query to the other L1 peer nodes 12-2 through 12-A and the L2 peer node 16-1 in the L1 peer group 20 over the query channel 28 (step 200). The L1 peer node 12-1 may send the query in response to, for example, a request from an associated user for content satisfying search criteria. The search criteria may be, for example, one or more file types, one or more keywords, or the like or any combination thereof. By subscribing to the query channel 28, the other L1 peer nodes 12-2 through 12-A and the L2 peer node 16-1 receive the query. In response to receiving the query, the L2 peer node 16-1 multicasts the query to the other L2 peer nodes 16-2 through 16-C and the L3 peer node 18 via the query channel 36 (step 202). Note that in this example, only the L2 peer node 16-C and the L3 peer node 18 are illustrated for clarity and ease of discussion. However, it should be appreciated that the following discussion is equally applicable to the other L1 peer groups. In response to the query from the L2 peer node 16-1, the L2 peer node 16-C multicasts the query to the L1 peer nodes 14-1 through 14-B via the query channel 32 for the L1 peer group 22 (step 204). Note that in an alternative embodiment, the L3 peer node 18 may also be a L2 peer node having an associated L1 peer group. Thus, in this alternative embodiment, the L3 peer node 18 may multicast the query to L1 peer nodes in its L1 peer group.

In this example, the query includes an IP address or some other network identifier of the L1 peer node 12-1. As such, in response to receiving the query, the L1 peer nodes 12-2 through 12-A and 14-1 through 14-B, the L2 peer nodes 16-1 through 16-C, and the L3 peer node 18 send responses directly to the L1 peer node 12-1, which is referred to herein as the querying peer node (steps 206-218). Note that in the preferred embodiment, the L2 peer nodes 16-1 through 16-C and the L3 peer node 18 are peer nodes in the P2P network 10 and therefore respond to the query. However, the present invention is not limited thereto.

More specifically, in response to receiving the query, the L1 peer nodes 12-2 through 12-A and 14-1 through 14-B, the L2 peer nodes 16-1 through 16-C, and the L3 peer node 18 determine whether they host content satisfying the query. If so, the L1 peer nodes 12-2 through 12-A and 14-1 through 14-B, the L2 peer nodes 16-1 through 16-C, and the L3 peer node 18 generate responses and provide the responses to the L1 peer node 12-1. Each of the responses may include, for example, information identifying the content satisfying the query and information such as an IP address, Uniform Resource Locator (URL), or some other network identifier enabling the L1 peer node 12-1 to obtain the content from the corresponding one of the L1 peer nodes 12-2 through 12-A and 14-1 through 14-B, the L2 peer nodes 16-1 through 16-C, and the L3 peer node 18. Note that ones of the L1 peer nodes 12-2 through 12-A and 14-1 through 14-B, the L2 peer nodes 16-1 through 16-C, and the L3 peer node 18 that do not host content satisfying the query may not respond to the query.

Figure 4:
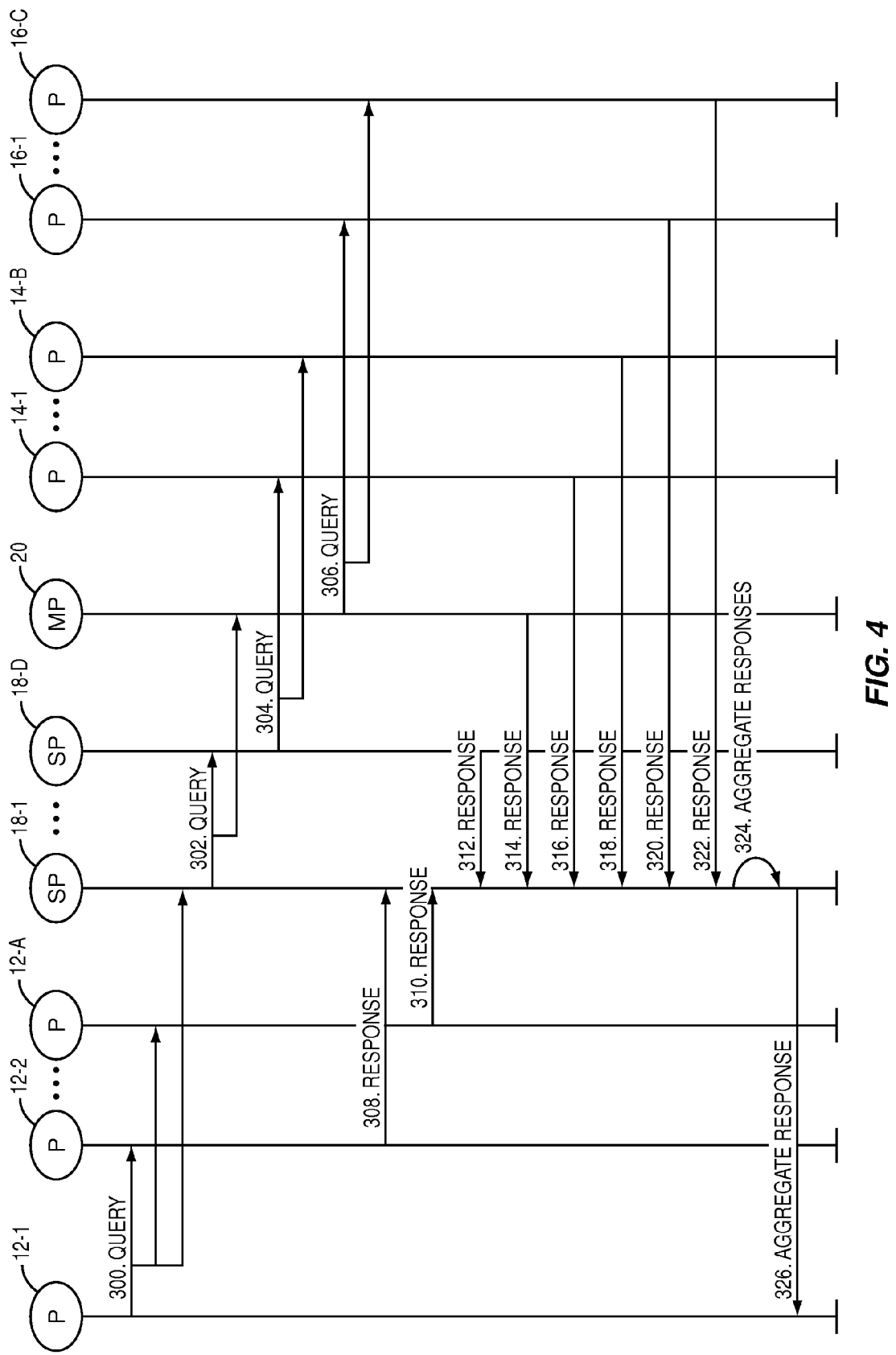
FIG. 4 illustrates the operation of the P2P network of FIG. 1 according to a second embodiment of the present invention.

FIG. 4 illustrates the operation of the P2P network 10 of FIG. 1 according to a second embodiment of the present invention. Steps 300-304 correspond to steps 200-204 of FIG. 3. In general, the L1 peer node 12-1 multicasts a query to the other L1 peer nodes 12-2 through 12-A and the L2 peer node 16-1 in the L1 peer group 20 over the query channel 28 (step 300). In response to the query, the L2 peer node 16-1 multicasts the query to the other L2 peer nodes 16-2 through 16-C and the L3 peer node 18 via the query channel 36 (step 302). Note that in this example, only the L2 peer node 16-C and the L3 peer node 18 are illustrated for clarity and ease of discussion. However, it should be appreciated that the following discussion is equally applicable to the other L2 peer nodes. In response to the query from the L2 peer node 16-1, the L2 peer node 16-C multicasts the query to the L1 peer nodes 14-1 through 14-B via the query channel 32 for the L1 peer group 22 (step 304). Note that in an alternative embodiment, the L3 peer node 18 may also be a L2 peer node having an associated L1 peer group. Thus, in this alternative embodiment, the L3 peer node 18 may multicast the query to peer nodes in its L1 peer group.

In this example, the query includes an IP address or some other network identifier of the L2 peer node 16-1 associated with the querying L1 peer node 12-1. As such, in response to receiving the query, the L1 peer nodes 12-2 through 12-A and 14-1 through 14-B, the L2 peer node 16-C, and the L3 peer node 18 send responses directly to the L2 peer node 16-1 (steps 306-316). Further note that while in this example the L1 peer nodes 12-2 through 12-A respond to the L2 peer node 16-1, the L1 peer nodes 12-2 through 12-A, which are in the L1 peer group 20 of the querying L1 peer node 12-1, may alternatively respond directly to the L1 peer node 12-1 via, for example, the query channel 28 of the L1 peer group 20.

More specifically, in response to receiving the query, the L1 peer nodes 12-2 through 12-A and 14-1 through 14-B, the L2 peer node 16-C, and the L3 peer node 18 determine whether they host content satisfying the query. If so, the L1 peer nodes 12-2 through 12-A and 14-1 through 14-B, the L2 peer node 16-C, and the L3 peer node 18 generate responses and provide the responses to the L2 peer node 16-1. Each of the responses may include, for example, information identifying the content satisfying the query and information such as an IP address, URL, or some other network identifier enabling the L1 peer node 12-1 to obtain the content from the corresponding one of the L1 peer nodes 12-2 through 12-A and 14-1 through 14-B, the L2 peer node 16-C, and the L3 peer node 18. Note that ones of the L1 peer nodes 12-2 through 12-A and 14-1 through 14-B, the L2 peer node 16-C, and the L3 peer node 18 that do not host content satisfying the query may not respond to the query.

Upon receiving the responses, the L2 peer node 16-1 aggregates the responses to provide an aggregate response (step 318). Note that at some point after receiving the query, the L2 peer node 16-1 may determine whether it hosts content satisfying the query. If so, a response of the L2 peer node 16-1 is also included in the aggregate response. In addition, the L2 peer node 16-1 may filter the responses to, for example, remove offensive or obscene content, remove responses from peer nodes that satisfy predetermined criteria such as having a network connection, having a connection speed that is less than a desired threshold, or the like. These filtering criteria are exemplary and are not intended to limit the scope of the present invention. Other filtering criteria will be apparent to one of ordinary skill in the art upon reading this disclosure.

The L2 peer node 16-1 then sends the aggregate response to the L1 peer node 12-1 (step 320). The aggregate response may be sent to the L1 peer node 12-1 via the query channel 28 of the L1 peer group 20 or unicast to the L1 peer node 12-1 using a separate connection. If the aggregate response is sent to the L1 peer node 12-1 via the query channel 28, the aggregate response may include an identifier such as a query ID or peer ID of the L1 peer node 12-1. Note that the aggregate response may be sent all at once or periodically in portions as responses are received. Thereafter, if desired, the L1 peer node 12-1 may establish a connection with one or more of the L1 peer nodes 12-2 through 12-A and 14-1 through 14-B, the L2 peer nodes 16-1 through 16-C; and the L3 peer node 18 to obtain desired content identified by the aggregate response.

Figure 5:
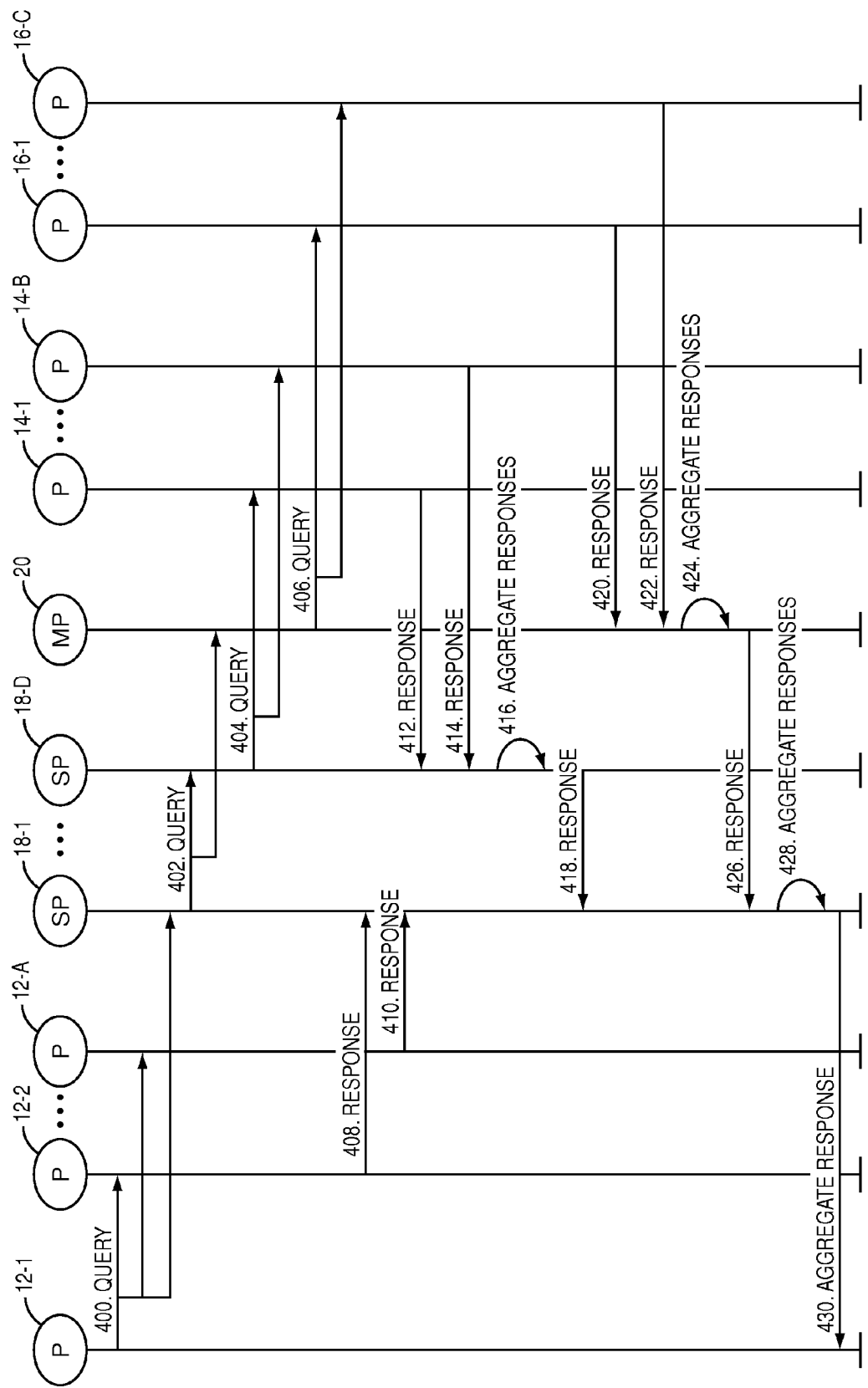
FIG. 5 illustrates the operation of the P2P network of FIG. 1 according to a third embodiment of the present invention.

FIG. 5 illustrates the operation of the P2P network 10 according to a third embodiment of the present invention. Steps 400-404 correspond to steps 200-204 of FIG. 3 and steps 300-304 of FIG. 4. In general, the L1 peer node 12-1 multicasts a query to the other L1 peer nodes 12-2 through 12-A and the L2 peer node 16-1 in the L1 peer group 20 over the query channel 28 (step 400). In response, the L2 peer node 16-1 multicasts the query to the other L2 peer nodes 16-2 through 16-C and the L3 peer node 18 via the query channel 36 (step 402). Note that in this example, only the L2 peer node 16-C and the L3 peer node 18 are illustrated for clarity and ease of discussion. However, it should be appreciated that the following discussion is equally applicable to the other L2 peer nodes. In response to the query from the L2 peer node 16-1, the L2 peer node 16-C multicasts the query to the L1 peer nodes 14-1 through 14-B via the query channel 32 for the L1 peer group 22 (step 404). Note that in an alternative embodiment, the L3 peer node 18 may also be an L2 peer node having an associated L1 peer group. Thus, in this alternative embodiment, the L3 peer node 18 may multicast the query to L1 peer nodes in its L1 peer group.

In this example, in response to receiving the query, the L1 peer nodes 12-2 through 12-A send responses to the L2 peer node 16-1 of the L1 peer group 20 (steps 406-408). The responses may be sent via the query channel 28 of the L1 peer group 20 or via separate communication channels. As discussed above, each response may include, for example, information identifying the content satisfying the query and information such as an IP address, URL, or some other network identifier enabling the L1 peer node 12-1 to obtain the content from the corresponding one of the L1 peer nodes 12-2 through 12-A. Note that ones of the L1 peer nodes 12-2 through 12-A that do not host content satisfying the query may not provide responses to the L2 peer node 16-1. In an alternative embodiment, rather than responding to the L2 peer node 16-1, the L1 peer nodes 12-2 through 12-A in the L1 peer group 20 of the querying L1 peer node 12-1 may respond directly to the querying L1 peer node 12-1 via the query channel 28 of the L1 peer group 20 or separate communication channels.

Regarding the L1 peer group 22, upon receiving the query, the L1 peer nodes 14-1 through 14-B send responses to the L2 peer node 16-C of the L1 peer group 22 (steps 410-412). The responses may be sent via the query channel 32 of the L1 peer group 22 or via separate communication channels. Note that ones of the L1 peer nodes 14-1 through 14-B that do not host content satisfying the query may not provide responses to the L2 peer node 16-C. The L2 peer node 16-C then aggregates the responses from the L1 peer nodes 14-1 through 14-B and optionally a response of the L2 peer node 16-C (step 414) and provides the combined response of the L1 peer group 22 to the L2 peer node 16-1 (step 416). Note that the combined response may be sent all at once or periodically in portions as responses are received. Alternatively, the L2 peer node 16-C may respond directly to the L1 peer node 12-1.

The L3 peer node 18 also provides a response to the L2 peer node 16-1 identifying content hosted by the L3 peer node 18 satisfying the query (step 418). In the alternative embodiment where the L3 peer node 18 is also an L2 peer node of an associated L1 peer group, the L1 peer group may respond to the query in a manner similar to that described above with respect to the L1 peer group 22.

The L2 peer node 16-1 aggregates the responses from the L2 peer node 16-C and the L3 peer node 18 to provide an aggregate response (step 420). Note that at some point after receiving the query, the L2 peer node 16-1 may determine whether it hosts content satisfying the query. If so, a response of the L2 peer node 16-1 is also included in the aggregate response. In addition, the L2 peer node 16-1 may filter the responses to, for example, remove offensive or obscene content, remove responses from peer nodes that satisfy predetermined criteria such as having a network connection, having a connection speed that is less than a desired threshold, or the like. These filtering criteria are exemplary and are not intended to limit the scope of the present invention. Other filtering criteria will be apparent to one of ordinary skill in the art upon reading this disclosure.

The L2 peer node 16-1 then sends the aggregate response to the L1 peer node 12-1 (step 422). The aggregate response may be sent to the L1 peer node 12-1 via the query channel 28 of the L1 peer group 20 or unicast to the L1 peer node 12-1 using a separate connection. Note that the L2 peer node 16-1 may send the aggregate response after receiving all responses from the other L2 peer nodes 16-C and L3 peer node 18. Alternatively, the L2 peer node 16-1 may periodically send portions of the aggregate response as responses are received from the other L2 peer nodes 16-C and the L3 peer node 18 such that the L1 peer device 12-1 starts to receive responses more quickly. Further, the L2 peer node 16-1 may stop receiving responses to the query after some defined time-out period. After receiving the aggregate response, if desired, the L1 peer node 12-1 may establish a connection with one or more of the L1 peer nodes 12-2 through 12-A and 14-1 through 14-B, the L2 peer nodes 16-1 through 16-C, and the L3 peer node 18 to obtain desired content identified by the aggregate response.

FIGS. 3-5 illustrate three different query response schemes. In one embodiment, the P2P network 10 uses one of these query response schemes. In another embodiment, the P2P network 10 may be configurable such that a desired one of the query response schemes may be used for a particular query, for all queries from a particular peer node, for queries originating in a L1 peer group, or the like. For example, either as part of the query or as part of defined user preferences, a user may indicate that the query or all queries from the associated peer node are to use a desired one of the query response schemes. Still further, the P2P network 10 may be configured such that different schemes are used for the same query such that some responses to the query are provided directly to the querying peer node while others are provided directly or indirectly to the L2 peer node of the querying node for aggregation. For example, responses from particular peer nodes or from peer nodes in particular peer groups may be desired to be sent directly to the querying peer node while responses from other peer nodes or peer nodes in other peer groups may be desired to be sent directly or indirectly to the L2 peer node of the querying peer node.

In one embodiment, the query may contain a flag that limits the scope of propagation of the query throughout the P2P network 10. Using the L1 peer node 12-1 as an example, a query from the L1 peer node 12-1 may contain a flag limiting propagation of the query to, for example, the L1 peer group 20, only the L2 peer nodes 16-1 through 16-C including the L3 peer node 18, only nodes (whether L1 peer nodes, L2 peer nodes, or L3 peer nodes) within a desired range of one or more IP addresses, or the like.

For various reasons, it may be desirable to limit the permissible sources on the query channels 28, 32, and 36. Using the query channel 28 as an example, the L2 peer node 16-1 may monitor the number of queries issued by each of the L1 peer nodes 12-1 through 12-A in the L1 peer group 20 over time and the query criteria such as search terms, length, expressions, and the like. The L2 peer node 16-1 may then use predetermined criteria to determine whether to remove any of the L1 peer nodes 12-1 through 12-A from the permissible sources for the query channel 28. For example, if the L1 peer node 12-1 issues a number of queries that exceeds a predetermined limit of queries within a defined amount of time, the L1 peer node 12-1 may be removed from the list of permissible sources for the query channel 28. The updated list of permissible sources may then be multicast to the L1 peer nodes 12-1 through 12-A via the control channel 26. As another example, if the L1 peer node 12-1 issues a query containing one of a list of prohibited keywords or search terms, the L1 peer node 12-1 may be removed from the list of permissible sources. As a final example, if the L1 peer node 12-1 issues a query that returns or would return more than a predetermined maximum number of results, then the L1 peer node 12-1 may be removed from the list of permissible sources.

While the discussion herein focuses on a three-level P2P network (L1 peer nodes, L2 peer nodes, and L3 peer node), the present invention is scalable to an N-level P2P network. For example, the P2P network 10 may include a number of L2 peer groups, where each L2 peer group is like that illustrated in FIG. 1. One of the L3 peer nodes may then be elected or otherwise selected as a fourth level peer node that allocates control and query channels for communication among the L3 peer nodes. Thereafter, queries may be propagated through the P2P network 10 in a manner similar to that described above with respect to FIGS. 3-5.

The query propagation scheme of the present invention provides substantial benefits over traditional P2P querying schemes. For instance, the query propagation scheme of the present invention mimics real-world constraints on the typical broadband connection. Broadband services typically provide asymmetric bandwidth, where upstream bandwidth is generally a fraction of downstream bandwidth. By using the query channels 28, 32, and 36, queries are sent upstream to a virtually unlimited number of listeners with minimal bandwidth. Further, the nodes may easily listen (downstream) to many queries from many other nodes due to the large downstream bandwidth. As another example, persistent connections between the L1 peer nodes 12-1 through 12-A and 14-1 through 14-B and the corresponding L2 peer nodes 16-1 through 16-C are not needed to send and receive queries. As a result, each L2 peer node 16-1 through 16-C and the L3 peer node 18 may each serve substantially more peer nodes than super peer nodes in a traditional P2P network.

More specifically, traditional P2P networks can support dozens of peer nodes per super peer node. The P2P network 10 of the present invention can support thousands of L1 peer nodes per L2 peer node. For example, the L2 peer node 16-1 may be connected to the Internet via a commercial broadband connection. The commercial broadband connection may feature 3 Mbps downstream bandwidth and 512 Kbps upstream bandwidth. If the typical query is 64 bytes (512 bits) of information, the L2 peer node 16-1 has sufficient bandwidth to forward approximately 1000 queries per second to the multicast group, where the multicast group is formed by the other L2 peer nodes 16-2 through 16-C and the L3 peer node 18. Considering that only a small number of peer nodes are generally actively querying at any given moment, thousands of peers may be served by the L2 peer node 16-1.

Figure 6:
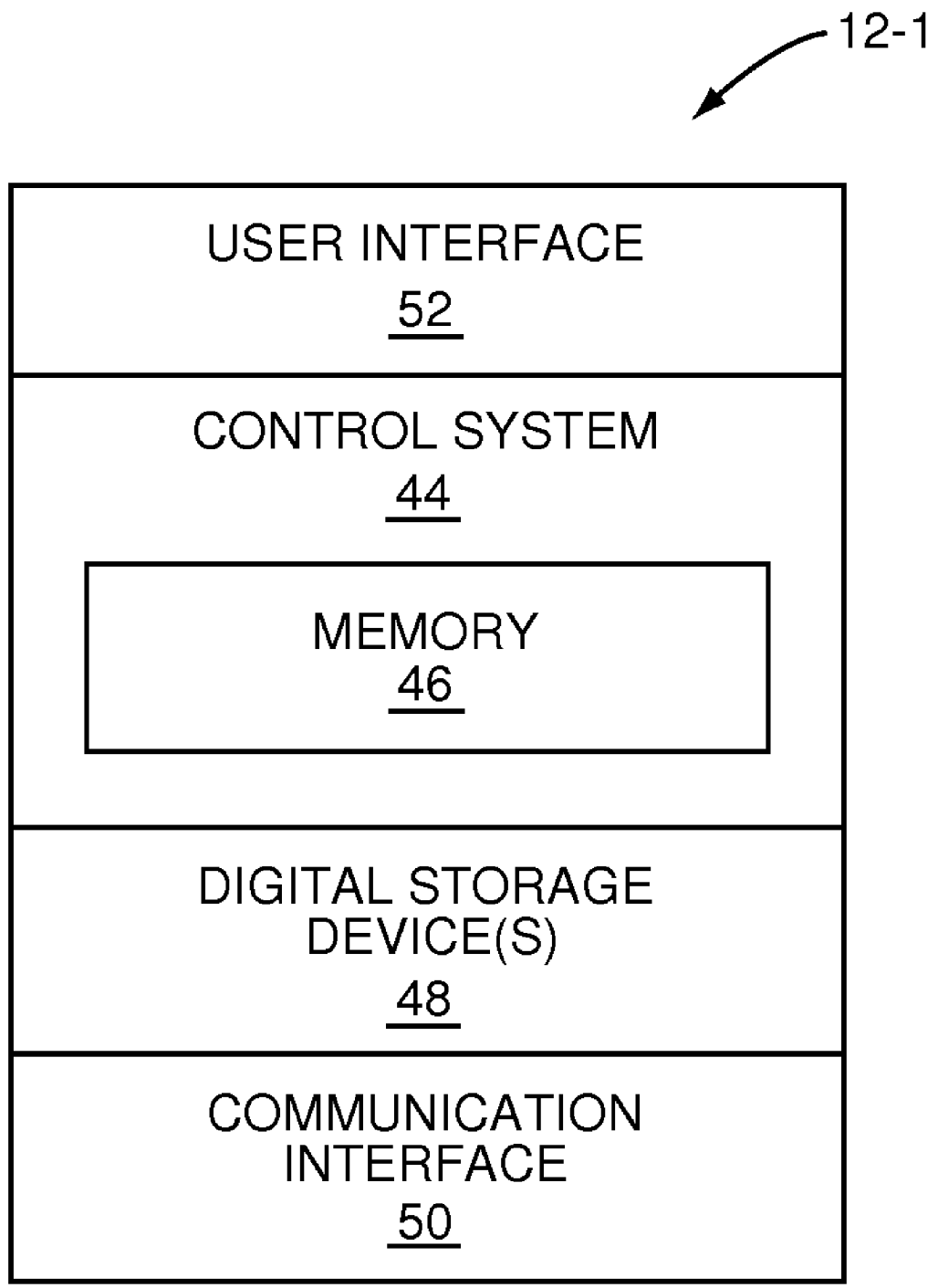
FIG. 6 illustrates a peer node according to one embodiment of the present invention.

FIG. 6 illustrates the L1 peer node 12-1 according to one embodiment of the present invention. This discussion is equally applicable to the other L1 peer nodes 12-2 through 12-A and 14-1 through 14-B as well as the L2 peer nodes 16-1 through 16-C and the L3 peer node 18. Generally, this discussion is applicable to each node in the P2P network 10. In general, the L1 peer node 12-1 includes a control system 38 having associated memory 40. In one embodiment, the memory 40 stores software instructing the L1 peer node 12-1 to operate according to the present invention. In addition, the L1 peer node 12-1 may include one or more digital storage devices 42 such as one or more hard drives, one or more optical storage devices, internal or removable memory, or the like. The L1 peer node 12-1 also includes a communication interface 44 communicatively coupling the L1 peer node 12-1 to a network, where the control and query channels 26 and 28 are formed over the network. The L1 peer node 12-1 also includes a user interface 46, which may include components such as, for example, a display, one or more user input devices, speakers, and the like.

It should be noted that the present invention provides substantial opportunity for variation without departing from the spirit or scope of the present invention. For example, while all of the L1 peer nodes discussed herein use multicasting to interact with the associated L2 peer nodes, the present invention is not limited thereto. Some, or even all, of the L1 peer nodes may alternatively use unicast connections to the associated L2 peer nodes for query propagation. Further, some of the L1 peer nodes in an L1 peer group may use multicasting for query propagation while other L1 peer nodes in the L1 peer group may use unicasting for query propagation.

Those skilled in the art will recognize improvements and modifications to the preferred embodiments of the present invention. All such improvements and modifications are considered within the scope of the concepts disclosed herein and the claims that follow.

What is claimed is:

1. A second level (L2) peer node operating as a super peer node for a plurality of first level (L1) peer nodes in a Peer-to-Peer (P2P) network comprising:
   a communication interface communicatively coupling the L2 peer node to a network; and
   a control system associated with the communication interface and configured to:
      provide a first query multicast channel, wherein the L2 peer node and the plurality of L1 peer nodes associated with the L2 peer node are subscribed to the first query multicast channel in order to propagate queries throughout the P2P network;
      receive a query from a querying peer node of the plurality of L1 peer nodes via the first query multicast channel;
      multicast the query to a plurality of other L2 peer nodes in the P2P network via a second query multicast channel;
      provide a first control multicast channel to which the plurality of L1 peer nodes are subscribed, the first control multicast channel being a SSM channel having the L2 peer node as a permissible source;
      multicast a list of permissible sources able to use the first query multicast channel to the plurality of L1 peer nodes via the first control multicast channel, the list of permissible sources comprising at least one of the plurality of L1 peer nodes including the querying peer node, wherein the L2 peer node bases the list on activities of ones of the plurality of L1 peer nodes;
      receive responses to the query directly from ones of pluralities of L1 peer nodes associated with the plurality of other L2 peer nodes;
      aggregate the responses to the query from the ones of the pluralities of L1 peer nodes to provide an aggregate response, wherein aggregating includes filtering the responses based on system characteristics of the ones of pluralities of L1 peer nodes; and
      provide the aggregate response to the querying peer node.

2. The L2 peer node of claim 1 wherein the first query multicast channel is a Source-Specific Multicast (SSM) channel.

3. The L2 peer node of claim 2 wherein the second query multicast channel is a SSM channel provided by a third level (L3) peer node, and the control system is further adapted to:
   subscribe to a second control multicast channel provided by the L3 peer node, the second control multicast channel being an SSM channel having the L3 peer node as a permissible source; and
   receive a list of permissible sources for the second query multicast channel from the L3 peer node via the second control multicast channel.

4. The L2 peer node of claim 3 wherein the L3 peer node is a select one of the plurality of other L2 peer nodes.

5. The L2 peer node of claim 2 wherein the control system is further adapted to:
   monitor queries from the plurality of L1 peer nodes based on at least one criterion to identify ones of the plurality of L1 peer nodes to remove from the list of permissible sources for the first query multicast channel;
   remove the ones of the plurality of L1 peer nodes from the list of permissible sources for the first query multicast channel to provide an updated list of permissible sources; and multicast the updated list of permissible sources for the first query multicast channel to the plurality of L1 peer nodes via the first control multicast channel.

6. The L2 peer node of claim 1 wherein the control system is further adapted to receive responses to the query from ones of the plurality of other L2 peer nodes and aggregate the responses from the ones of the pluralities of L1 peer nodes and the ones of the plurality of other L2 peer nodes to provide the aggregate response.

7. The L2 peer node of claim 1 wherein in order to provide the aggregate response to the querying peer node, the control system is further adapted to multicast the aggregate response via the first query multicast channel.

8. The L2 peer node of claim 1 wherein the control system is further adapted to:
receive responses to the query from the plurality of other L2 peer nodes, the responses including responses from the ones of pluralities of L1 peer nodes associated with the plurality of other L2 peer nodes;
aggregate the responses to the query from the plurality of other L2 peer nodes to provide an aggregate response; and
provide the aggregate response to the query from the plurality of other L2 peer nodes to the querying peer node.

9. The L2 peer node of claim 8 wherein the control system is further adapted to receive the responses to the query from the plurality of other L2 peer nodes via the second query multicast channel.

10. The L2 peer node of claim 8 wherein in order to provide the aggregate response to the querying peer node, the control system is further adapted to multicast the aggregate response via the first query multicast channel.

11. The L2 peer node of claim 1 wherein the control system is further adapted to:
receive a second query from one of the plurality of other L2 peer nodes via the second query multicast channel, the second query originating from one of a second plurality of L1 peer nodes associated with the one of the plurality of other L2 peer nodes; and
multicast the second query to the plurality of L1 peer nodes via the first query multicast channel.

12. The L2 peer node of claim 11 wherein the control system is further adapted to:
receive responses to the second query from ones of the plurality of L1 peer nodes;
aggregate the responses to the second query from the ones of the plurality of L1 peer nodes to provide an aggregate response; and
provide the aggregate response to the one of the plurality of other L2 peer nodes.

13. The L2 peer node of claim 12 wherein the control system is further adapted to provide the aggregate response to the one of the plurality of other L2 peer nodes via the second query multicast channel.

14. The L2 peer node of claim 11 wherein the control system is further adapted to:
receive responses to the second query from ones of the plurality of L1 peer nodes;
aggregate the responses to the second query from the ones of the plurality of L1 peer nodes to provide an aggregate response; and
provide the aggregate response directly to the one of the second plurality of L1 peer nodes.

15. A Peer-to-Peer (P2P) network comprising:
a) a first level one (L1) peer group comprising:
i) a first level two (L2) peer node operating as a super peer node for the first L1 peer group and subscribing to a first query multicast channel and a L2 query multicast channel; and
ii) a first plurality of L1 peer nodes associated with the first L2 peer node and subscribing to the first query multicast channel, wherein the first L2 peer node is configured to:
1. provide a first control multicast channel to which the first plurality of L1 peer nodes are subscribed, the first control multicast channel being a SSM channel having the first L2 peer node as a permissible source; and
2. multicast a list of permissible sources able to use the first query multicast channel to the first plurality of L1 peer nodes via the first control multicast channel, the list of permissible sources comprising at least one of the first plurality of L1 peer nodes including the one of the first plurality of L1 peer nodes, wherein the first L2 peer node bases the list on activities of ones of the first plurality of L1 peer nodes; and
b) a second L1 peer group comprising:
i) a second L2 peer node operating as a super peer node for the second L1 peer group and subscribing to a second query multicast channel and the L2 query multicast channel; and
ii) a second plurality of L1 peer nodes associated with the second L2 peer node and subscribing to the second query multicast channel; and
wherein in order to propagate a query throughout the P2P network:
one of the first plurality of L1 peer nodes is further adapted to multicast the query to others of the first plurality of L1 peer nodes and the first L2 peer node via the first query multicast channel;
the first L2 peer node is further adapted to multicast the query to the second L2 peer node via the L2 query multicast channel;
the second L2 peer node is further adapted to multicast the query to the second plurality of L1 peer nodes via the second query multicast channel, wherein the others of the first plurality of L1 peer nodes are adapted to provide a response to the query directly to the first L2 peer node; and
the first L2 peer node is further configured to aggregate the responses from the others of the first plurality of L1 peer nodes to provide an aggregate response and provide the aggregate response to the one of the first plurality of L1 peer nodes, wherein providing the aggregate response includes filtering the responses based on system characteristics of the others of the first plurality of L1 peer nodes.

16. The P2P network of claim 15 wherein the first query multicast channel, the second query multicast channel, and the L2 query multicast channel are Source-Specific Multicast (SSM) channels.

17. The P2P network of claim 15 wherein:
the second L2 peer node is further adapted to:
provide a second control multicast channel to which the second plurality of L1 peer nodes are subscribed, the second control multicast channel being a SSM channel having the second L2 peer node as a permissible source; and multicast a list of permissible sources for the second query multicast channel to the second plurality of L1 peer nodes via the second control multicast channel, the list of permissible sources comprising at least one of the second plurality of L1 peer nodes.

18. The P2P network of claim 17 further comprising a level three (L3) peer node subscribing to the L2 query multicast channel and adapted to:

provide an L2 control multicast channel to which the first L2 peer node and the second L2 peer node are subscribed, the L2 control multicast channel being a SSM channel having the L3 peer node as a permissible source; and multicast a list of permissible sources for the L2 query multicast channel to the first L2 peer node and the second L2 peer node via the L2 control multicast channel, the list of permissible sources comprising at least the first L2 peer node.

19. The P2P network of claim 15 wherein the others of the first plurality of L1 peer nodes and the second plurality of L1 peer nodes are further adapted to provide responses to the query directly to the one of the first plurality of L1 peer nodes.

20. The P2P network of claim 16 wherein:

each of the second plurality of L1 peer nodes is further adapted to provide a response to the query directly to the first L2 peer node; and the first L2 peer node is further adapted to aggregate the responses from the second plurality of L1 peer nodes to provide an aggregate response, and provide the aggregate response to the one of the first plurality of L1 peer nodes.

21. The P2P network of claim 15 wherein:

each of the second plurality of L1 peer nodes is further adapted to provide a response to the query to the second L2 peer node;

the second L2 peer node is further adapted to provide the responses from the second plurality of L1 peer nodes to the first L2 peer node; and the first L2 peer node is further adapted to provide the responses from the second L2 peer node to the one of the first plurality of L1 peer nodes.

22. A second level (L2) peer node operating as a super peer node for a plurality of first level (L1) peer nodes in a Peer-to-Peer (P2P) network comprising:

a communication interface communicatively coupling the L2 peer node to a network; and a control system associated with the communication interface and configured to:

provide a first query multicast channel, wherein the L2 peer node and the plurality of L1 peer nodes associated with the L2 peer node are subscribed to the first query multicast channel in order to propagate queries throughout the P2P network;

receive a query from a querying peer node of the plurality of L1 peer nodes via the first query multicast channel;

multicast the query to a plurality of other L2 peer nodes in the P2P network via a second query multicast channel;

determine if the querying peer node is a source of an excessive number of queries;

throttle additional queries from the querying peer node if the querying peer node is a source of an excessive number of queries;

provide a first control multicast channel to which the plurality of L1 peer nodes are subscribed, the first control multicast channel being a SSM channel having the L2 peer node as a permissible source;

multicast a list of permissible sources able to use the first query multicast channel to the plurality of L1 peer nodes via the first control multicast channel, the list of permissible sources comprising at least one of the plurality of L1 peer nodes including the querying peer node, wherein the L2 peer node bases the list on activities of ones of the plurality of L1 Peer nodes.

* * * * *